US008477219B2

(12) United States Patent
Takatori (10) Patent No.: US 8,477,219 B2
(45) Date of Patent: Jul. 2, 2013

(54) IMAGE PROCESSING DEVICE, IMAGE PROCESSING METHOD, AND PROGRAM (75) Inventor: Jiro Takatori, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/298,786

(22) Filed: Nov. 17, 2011

(65) Prior Publication Data

US 2012/0147226 A1 Jun. 14, 2012

(30) Foreign Application Priority Data

Dec. 10, 2010 (JP) ................... 2010-275819

(51) Int. Cl.
*H04N 5/217* (2011.01)
*H04N 5/225* (2006.01)
(52) U.S. Cl.
USPC ..................................... 348/241; 348/207.99
(58) Field of Classification Search
USPC ................... 348/241–254, 207.99; 358/3.26, 358/3.27, 463; 382/272
See application file for complete search history.

(56) References Cited

U.S. PATENT DOCUMENTS

| 5,671,264 A * | 9/1997 | Florent et al. .................. 378/98 |
| 2003/0228067 A1* | 12/2003 | Miyake et al. ................ 382/275 |
| 2007/0097236 A1* | 5/2007 | Yoo et al. ...................... 348/241 |
| 2008/0175510 A1* | 7/2008 | Matsushita .................... 382/260 |
| 2009/0033773 A1* | 2/2009 | Kinoshita et al. ............. 348/241 |
| 2009/0219416 A1* | 9/2009 | Tsuruoka ...................... 348/241 |

* cited by examiner

*Primary Examiner* — Lin Ye
*Assistant Examiner* — Euel Cowan
(74) *Attorney, Agent, or Firm* — Oblon, Spivak, McClelland, Maier & Neustadt, L.L.P.

(57) ABSTRACT

An image processing device includes: a peripheral objective pixel random acquiring section acquiring pixels obtained by sampling peripheral pixels located in a periphery of a marked pixel which is marked at random with respect to the marked pixel of pixels corresponding to an objective image as an object of noise removal as peripheral objective pixels as pixels used for filtering for noise removal; and a noise removing section carrying out filtering for the noise removal by using the peripheral objective pixels.

4 Claims, 6 Drawing Sheets

PERIPHERAL PIXEL ACQUIRING PORTION

PIXEL THINNING-OUT PORTION

FIG.1

DIGITAL CAMERA

IMAGE PROCESSING DEVICE, IMAGE PROCESSING METHOD, AND PROGRAM

BACKGROUND

The present disclosure relates to an image processing device, an image processing method, and a program. In particularly, the disclosure relates to an image processing device, an image processing method, and a program which can readily prevent reduction of an image quality, for example, in noise removal for an image.

For example, as disclosed in Japanese Patent Laid-Open No. 2005-311455, a method of filtering image data by using a conditional average filter such as an $\epsilon$ filter is known as a noise removing filter for efficiently removing a noise contained in image data such as so-called RAW data.

With the $\epsilon$ filter, the noise is removed by averaging a flat portion while an edge of an image is maintained.

That is to say, with the $\epsilon$ filter, for example, pixels corresponding to an objective image as an object of the noise removal are successively selected as a marked pixel to which attention is paid. Also, of peripheral pixels located in the periphery of the marked pixel, the peripheral pixels in each of which an absolute value of a difference in pixel value between corresponding one of the peripheral pixels and the marked pixel falls within a threshold value are each used as an object of the averaging. Also, an average value of the pixel values of the peripheral pixels each becoming an object of the averaging are obtained (the peripheral pixels each becoming the object of the averaging are averaged), and the resulting average value is used as a pixel value of the marked pixel.

For enhancing the effect of the noise removal by using the $\epsilon$ filter, it is known that it is effective to set an offset frequency of the $\epsilon$ filter at a low value.

Now, for example, when a high-sensitivity image is captured by high-speed image capturing (image capturing at a high-speed shutter speed) with a digital camera (such as a digital still camera or a digital video camera), an image (low-S/N ratio image) in which a Signal-to-Noise Ratio (S/N ratio) is remarkably deteriorated is obtained in some cases.

For the purpose of effectively removing the noise from the low-S/N ratio image data, it is necessary that a range of the peripheral pixels used for the filtering by the $\epsilon$ filter is widened, and the filtering by the $\epsilon$ filter is carried out by using a large number of peripheral pixels.

However, when a large number of peripheral pixels are used for the filtering by the $\epsilon$ filter, an amount of arithmetic operation required for the filtering is increased, and a processing time and a hardware scale are eventually increased.

Then, for example, a noise removing method is provided in Japanese Patent Laid-Open No. 2008-153917 (hereinafter referred to as Patent Document 1). In this case, in the noise removing method, a part of peripheral pixels is thinned out with a given pattern (a tap coefficient by which the pixel values of the pixels to be thinned out are multiplied is made zero, whereby the pixel values of the pixels by which the tap coefficient is multiplied are substantially thinned out), and the filtering by the $\epsilon$ filter is carried out by using the pixels after the tinning-out, in a word, a less number of peripheral pixels.

Here, when a part of the peripheral pixels is thinned out, and the filtering by the $\epsilon$ filter is carried out by using the pixels after the tinning-out, a so-called artifact is generated in the image after the filtering by the $\epsilon$ filter due to the thinning-out of the peripheral pixels, and thus the image quality is reduced.

In order to cope with such a situation, with the noise removing method disclosed in Patent Document 1, an image signal of an objective image is divided into a low-frequency component and a high-frequency component in terms of a band. In this case, for the image corresponding to the low-frequency component, the filtering by the $\epsilon$ filter is carried out by using the peripheral pixels after the thinning-out. On the other hand, for the image corresponding to the high-frequency component, the filtering by a median filter is carried out. Also, the image corresponding to the low-frequency component after the filtering, and the image corresponding to the high-frequency component after the filtering are synthesized with each other, thereby obtaining the objective image after the noise removal (post-noise removal image).

With the noise removing method disclosed in Patent Document 1, the peripheral pixels after the thinning-out used for the filtering by the $\epsilon$ filter are the pixels corresponding to the image signal containing therein the low-frequency component. Therefore, it is possible to suppress the artifact (the artifact of the high-frequency component of the objective image) generated in the image after the noise removal due to the thinning-out of the peripheral pixels. Thus, it is possible to obtain the post-noise removal image in which the reduction of the image quality due to the generation of the artifact is prevented.

SUMMARY

With the noise removing method as described above in which a part of the peripheral pixels is thinned out in accordance with the predetermined pattern, and the filtering by the $\epsilon$ filter is carried out by using the peripheral pixels after the thinning-out, an amount of arithmetic operation becomes less because the number of peripheral pixels used for the filtering by the $\epsilon$ filter is small. However, for the purpose of preventing the reduction of the image quality due to the artifact generated in the post-noise removal image, it is necessary to divide the image signal of the objective image into the low-frequency component and the high-frequency component in terms of the band.

The band division of the image signal of the objective image into the low-frequency component and the high-frequency component is carried out by using both of a Low-Pass Filter (LPF) and a High-Pass Filter (HPF). However, the LPF needs to be designed in such a way that the artifact can be suitably suppressed, which is troublesome.

In addition, it is troublesome that the band division needs to be necessarily carried out in order to prevent the reduction of the image quality of the post-noise removal image due to the generation of the artifact.

The present disclosure has been made in order to solve the problems described above, and it is therefore desirable to provide an image processing device, an image processing method, and a program which can readily preventing reduction of an image quality due to generation of an artifact in noise removal for an image.

In order to attain the desire described above, according to an embodiment of the present disclosure, there is provided an image processing device including: a peripheral objective pixel random acquiring section acquiring pixels obtained by sampling peripheral pixels located in a periphery of a marked pixel which is marked at random with respect to the marked pixel of pixels corresponding to an objective image as an object of noise removal as peripheral objective pixels as pixels used for filtering for noise removal; and a noise removing section carrying out filtering for the noise removal by using the peripheral objective pixels.

According to another embodiment of the present disclosure, there is provided an image processing method including: acquiring pixels obtained by sampling peripheral pixels located in a periphery of a marked pixel which is marked at random with respect to the marked pixel of pixels corresponding to an objective image as an object of noise removal as peripheral objective pixels as pixels used for filtering for noise removal by an image processing device; and carrying out filtering for the noise removal by using the peripheral objective pixels by the image processing device.

According to still another embodiment of the present disclosure, there is provided a program causing a computer to make a function so as to include: a peripheral objective pixel random acquiring section acquiring pixels obtained by sampling peripheral pixels located in a periphery of a marked pixel which is marked at random with respect to the marked pixel of pixels corresponding to an objective image as an object of noise removal as peripheral objective pixels as pixels used for filtering for noise removal; and a noise removing section carrying out filtering for the noise removal by using the peripheral objective pixels.

According to the embodiments of the present disclosure, the pixels obtained by sampling the peripheral pixels located in the periphery of the marked pixel which is marked at random with respect to the marked pixel of the pixels corresponding to the objective image as the object for the noise removal are acquired as the peripheral objective pixels as the pixels used for the filtering for the noise removal. Also, the filtering for the noise removal is carried out by using the peripheral objective pixels.

It is noted that the image processing device either may be an independent device or may be an internal block composing one apparatus or device.

In addition, the program can be provided in such a way that the program is either transmitted through a transmission media or recorded in a recording media.

As set forth hereinabove, according to the present disclosure, the reduction of the image quality due to the generation of the artifact can be readily prevented in the noise removal for the image.

DETAILED DESCRIPTION OF THE PREFERRED EMBODIMENTS

Embodiments of the present disclosure will be described in detail hereinafter with reference to the accompanying drawings.
1. Entire Configuration of Digital Camera FIG. 1 is a block diagram showing an entire configuration of a digital camera.

Figure 1:
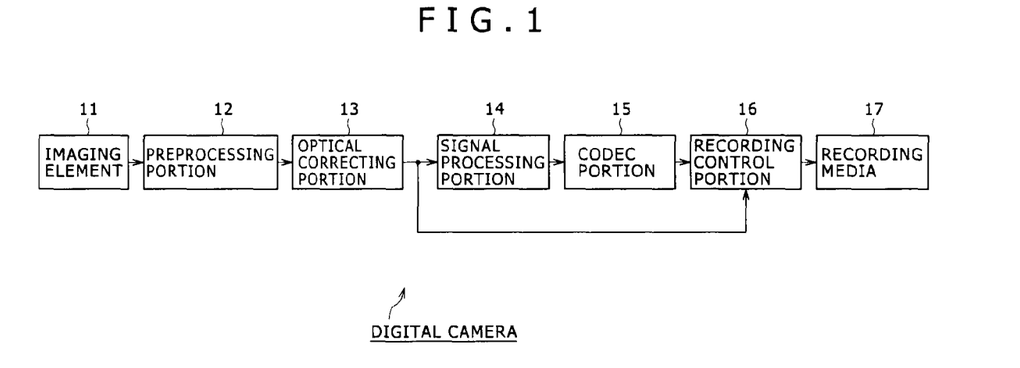
FIG. 1 is a block diagram showing an entire configuration of a digital camera.

Referring now to FIG. 1, the digital camera includes an imaging element 11, a preprocessing portion 12, an optical correcting portion 13, a signal processing portion 14, a codec portion 15, a recording control portion 16, and a recording media 17.

The imaging element 11 is composed of a Charged Coupled Device (CCD), a Complementary Metal-Oxide Semiconductor (CMOS) imager, or the like. The imaging element 11 photoelectrically converts an optical image formed on an imaging area by a lens unit (not shown) and outputs image signals as pixel values of Red, Green and Blue (RGB) of, for example, a Bayer arrangement.

The preprocessing portion 12 subjects the image signal outputted from the imaging element 11 to various kinds of processing such as correlation double sampling processing, automatic gain adjusting processing, Analog/Digital (A/D) conversion processing. Also, the preprocessing portion 12 supplies RAW data as the resulting digital image data to the optical correcting portion 13.

The optical correcting portion 13, for example, is composed of a Digital Signal Processor (DSP) or the like, and subjects the image data (RAW data) supplied thereto from the preprocessing portion 12 to defect correcting processing, white balance adjusting processing, noise removing processing, and the like. Also, the optical correcting portion 13 supplies the RAW data as the resulting image data to each of the signal processing portion 14 and the recoding control portion 16.

The signal processing portion 14 subjects the image data supplied thereto from the optical correcting portion 13 to de-mosaic processing, resolution converting processing, γ correction processing, image quality correcting processing, and the like. Also, the signal processing portion 14 outputs image data on a luminance signal and color difference signals.

The image data outputted from the signal processing portion 14 is supplied not only to the codec portion 15, but also to a display device (not shown) such as a liquid crystal panel. The display device displays thereon a so-called through image in correspondence to the image data supplied thereto from the signal processing portion 14.

The codec portion 15 compresses the image data supplied thereto from the signal processing portion 14 in accordance with a predetermined coding system and supplies the resulting compressed data to the recording control portion 16.

Here, when the image data supplied from the signal processing portion 14 is image data on a still image, the codec portion 15 compresses the image data supplied thereto from the signal processing portion 14 in accordance with a coding system for a still image such as a Joint Photographic Coding Experts Group (JPEG). In addition, when the image data supplied from the signal processing portion 14 is image data on a moving image, the codec portion 15 compresses the image data supplied thereto from the signal processing portion 14 in accordance with a coding system for a moving image such as a Moving Picture Experts Group (MPEG).

The recoding control portion 16 carries out recording control in accordance with which the compressed data supplied from the codec portion 15, and the RAW data supplied from the optical correcting portion 13 are recorded in the recording media 17.

The recording media 17, for example, is a semiconductor memory such as a memory card, a disc-like recording media such as an optical disc or a magnetic disk (hard disk), or a tape-like recording media such as a magnetic tape. The image data is recorded in the recording media 17 in accordance with the recording control made by the recording control portion 16.

It is noted that either a recording media built in the digital camera or a recording media detachably installed in the digital camera, or both of them can be adopted as the recording media 17.

2. First Embodiment

[First Configuration of Noise Removing Device]

Figure 2:
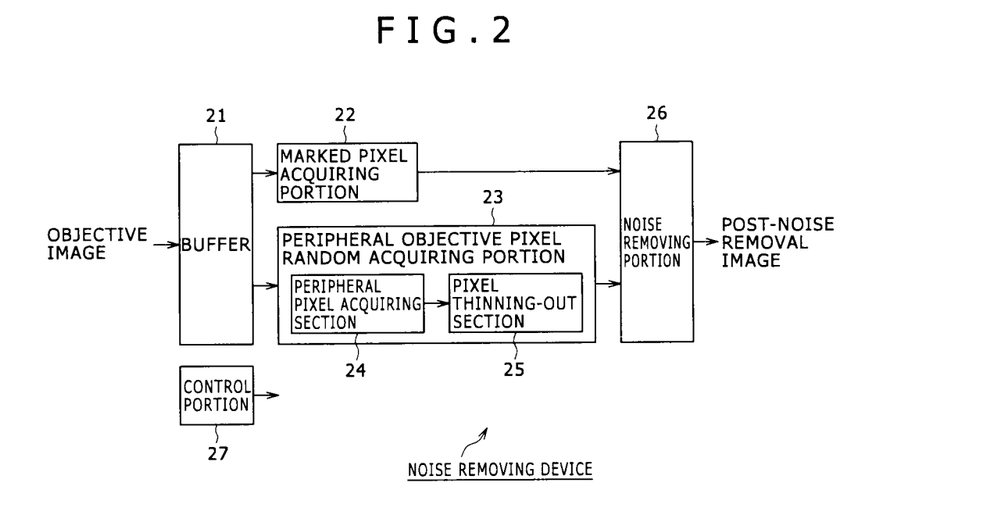
FIG. 2 is a block diagram showing a first configuration of a noise removing device as an image processing device according to a first embodiment of the present disclosure.

FIG. 2 is a block diagram showing a first configuration of a noise removing device, as a portion (image processing device) for executing noise removing processing according to a first embodiment of the present disclosure in the optical correcting portion 13 shown in FIG. 1.

Referring now to FIG. 2, the noise removing device includes a buffer 21, a marked pixel acquiring portion 22, a peripheral objective pixel random acquiring portion 23, a noise removing portion 26, and a control portion 27.

The image data (RAW data) from the preprocessing portion 12 is supplied as image data on an objective image as an object of noise removal to the buffer 21.

Here, hereinafter, for ease of a description, the objective image is supposed to be a still image.

The buffer 21, for example, is composed of plural line buffers, and temporarily stores therein the image data on the objective image supplied thereto from the preprocessing portion 12.

The marked pixel acquiring portion 22 successively selects the pixels corresponding to the objective image the image data on which is stored in the buffer 21, for example, in a raster scanning order as the marked pixel which is marked, and acquires the marked pixel by reading out the pixel value of the marked pixel from the buffer 21, and supplies the pixel value of the marked pixel thus read out to the noise removing portion 26.

Here, the control portion 27 which will be described later can supply the information on a defect pixel(s) of the imaging element 11 (refer to FIG. 1) to each of blocks 21 to 26 composing the noise removing device as may be necessary.

The marked pixel acquiring portion 22 determines whether or not the marked pixel is the defect pixel in accordance with the information on the defect pixel(s) supplied thereto from the control portion 27. When it is determined that the marked pixel is the defect pixel, the marked pixel acquiring portion 22, for example, adopts an average or the like of plural pixel values of plural pixels each adjacent to the marked pixel as the pixel value of the marked pixel.

The peripheral objective pixel random acquiring portion 23 acquires the pixels obtained by sampling the peripheral pixels located in the periphery of the marked pixel at random with respect to the marked pixel of the pixels, corresponding to the objective image, whose image values are stored in the buffer 21 by reading out the pixel values of these pixels as the peripheral objective pixels as the pixels used for the filtering for the noise removal. Also, the peripheral objective pixel random acquiring portion 23 supplies the pixel values of these pixels thus acquired to the noise removing portion 26.

Here, referring to FIG. 2, the peripheral objective pixel random acquiring portion 23 includes a peripheral pixel acquiring section 24 and a pixel thinning-out section 25.

The peripheral pixel acquiring section 24, for example, sets a peripheral area as a rectangular area having a predetermined size with the marked pixel as a center in accordance with the control made by the control portion 27. Also, the peripheral pixel acquiring section 24 acquires the pixels other than the marked pixel within the peripheral area as the peripheral pixels located in the periphery of the marked pixel by reading out the pixel values of these pixels from the buffer 21, and supplies the pixel values of these pixels thus acquired to the pixel thinning-out section 25.

The pixel thinning-out section 25 thins out the peripheral pixels by sampling the peripheral pixels whose pixel values are supplied thereto from the peripheral pixel acquiring section 24. Also, the pixel thinning-out section 25 supplies the pixel values of the remaining peripheral pixels, in a word, the pixel values of the peripheral pixels thus sampled as the pixel values of the peripheral objective pixels as the pixels used for the filtering for the noise removal to the noise removing portion 26.

The noise removing portion 26, for example, is composed of a conditional average filter such as the ε filter. Also, the noise removing portion 26 carries out the filtering for the noise removal with respect to the marked pixel by using both of the pixel values of the marked pixel supplied from the marked pixel acquiring portion 22, and the pixel values of the peripheral objective pixels supplied from the peripheral objective pixel random acquiring portion 23. Also, the noise removing portion 26 outputs the resulting pixel value after the filtering as the pixel value of the marked pixel of the post-noise removal image obtained by removing the noise from the image signal of the objective image.

That is to say, the noise removing portion 26, for example, is composed of a two-dimensional ε filter in which all of the tap coefficients are 1. Also, with the noise removing portion 26 such as the two-dimensional ε filter, both of the marked pixel, and the peripheral objective pixels in which absolute values of differences between the pixel values thereof and the pixel value of the marked pixel each fall within a predetermined threshold value are used as an object of weighted averaging having the tap coefficient as a weight. Under this condition, a weighted average of the pixel values of the pixels as the object of the weighted averaging is obtained, and is used as the pixel value of the marked pixel of the post-noise removal image.

It is noted that since in this case, all of the tap coefficients of the ε filter are 1, the weighted average obtained in the ε filter becomes an average value of the pixel values of the pixels as the object of the weighted averaging.

In addition, in this case, the ε filter in which all of the tap coefficients are 1 is adopted as the noise removing portion 26. In addition thereto, however, a filter, such as another ε filter or a bilateral filter, for carrying out the filtering for obtaining the conditional averaging of the pixel values of the pixels within a given area can also be adopted as the noise removing portion 26. In this case, in another ε filter, the larger value is obtained in the tap coefficient by which the pixel value of the pixel close to the marked pixel is multiplied. Also, in the bilateral filter, the tap coefficient is determined in accordance with both of a distance, and a difference of the pixel value with the marked pixel.

The control portion 27 controls the blocks 21 to 26 composing the noise removing device.

That is to say, for example, the control portion 27 acquires the information on the defect pixel of the imaging element 11 (refer to FIG. 1), and supplies the information thus acquired to the marked pixel acquiring portion 22 and the like.

In addition, for example, the control portion 27 controls (the peripheral pixel acquiring section 24 and the pixel thinning-out section 25 of) the peripheral objective pixel random acquiring portion 23 in accordance with a shutter speed of the digital camera (refer to FIG. 1).

Specifically, for example, when the shutter speed of the digital camera is set to a speed not being a high speed, that is to say, when the shutter speed of the digital camera is set to a value smaller than a predetermined threshold value such as a speed for the high-speed image capturing (the image capturing at a high shutter speed), the control portion 27, for example, controls the peripheral pixel acquiring section 24 so as to set a peripheral area having a predetermined size (hereinafter referred to as a default size as well) similar to the case of the noise removing processing for the existing digital camera or the like.

In addition, the control portion 27 sets a sampling pattern representing the positions of all of the pixels (except for the marked pixel) within the peripheral area as a sampling pattern representing the positions (the relative positions with the position of the marked pixel as a reference) of the pixels which are to be sampled at random. Also, the control portion 27 supplies data on the sampling pattern thus set to the pixel thinning-out section 25.

Therefore, in this case, in the peripheral objective pixel random acquiring portion 23, the peripheral pixel acquiring section 24 sets the peripheral area having the default size in accordance with the control made by the control portion 27. Also, the peripheral objective pixel random acquiring portion 23 acquires the pixel values of the pixels other than the marked pixel within the peripheral area as the pixel values of the peripheral pixels located in the periphery of the marked pixel by reading out the pixel values of the pixels other than the marked pixel within the peripheral area from the buffer 21. Also, the peripheral objective pixel random acquiring portion 23 supplies the pixel values of the peripheral pixels thus acquired to the pixel thinning-out section 25.

Also, the pixel thinning-out section 25 samples the peripheral pixels whose pixel values are supplied from the peripheral pixel acquiring section 24 in accordance with the sampling pattern the data on which is supplied thereto from the control portion 27. Also, the pixel thinning-out section 25 supplies the pixel values of the peripheral pixels thus sampled as the pixel values of the peripheral objective pixels to the noise removing portion 26.

In this case, in the pixel thinning-out section 25, all of the peripheral pixels whose pixel values are supplied from the peripheral pixel acquiring section 24, and the pixel values of all of the peripheral pixels are supplied as the pixel values of the peripheral objective pixels to the noise removing portion 26.

Therefore, when the shutter speed of the digital camera is set to the speed not being the high speed, and thus it is possible to expect the image capturing of the image having the S/N ratio equal to or larger than a certain degree, with the ε filter as the noise removing portion 26, similarly to the case of the existing digital camera or the like, the filtering is carried out by using all of the pixels within the peripheral area having the default size.

On the other hand, when the shutter speed of the digital camera is set to the high speed, that is, when, for example, the shutter speed of the digital camera is set to a value equal to or larger than the predetermined threshold value such as the speed for the high-speed image capturing, and as a result, the possibility that an image in which the S/N ratio is remarkably deteriorated is obtained as the objective image is high, for the purpose of effectively removing the noise from the image signal of such an image in which the S/N ratio is remarkably deteriorated, the control portion 27 controls the peripheral pixel acquiring section 24 so as to set the peripheral area having a size larger than the default size (hereinafter referred to as "a large size").

In addition, the control portion 27 selects the pixels having a predetermined rate such as ½ or ⅓ of the pixels (except for the marked pixel) within the peripheral area at random, and sets a sampling pattern representing the positions of the pixels thus selected, thereby supplying data on the sampling pattern thus set to the pixel thinning-out section 25.

Therefore, in this case, in the peripheral objective pixel random acquiring portion 23, the peripheral pixel acquiring section 24 sets the peripheral area having the large size in accordance with the control made by the control portion 27. Also, the peripheral pixel acquiring section 24 acquires the pixel values of the pixels other than the marked pixel within the peripheral area as the pixel values of the peripheral pixels located in the periphery of the marked pixel by reading out the pixel values of the pixels other than the marked pixel within the peripheral area from the buffer 21, thereby supplying the pixel values of the pixels other than the marked pixel within the peripheral area to the pixel thinning-out section 25.

Here, in this case, the size of the peripheral area is the large size. Thus, when all of the pixels within such a peripheral area used for the filtering in the noise removing portion 26, an amount of arithmetic operation required for the filtering becomes large.

Then, the pixel thinning-out section 25 samples the peripheral pixels whose pixel values are supplied thereto from the peripheral pixel acquiring section 24 (at random), and supplies the pixel values of the peripheral pixels thus sampled as the pixel values of the peripheral objective pixels to the noise removing portion 26.

In this case, the sampling pattern represents the positions of the pixels having the predetermined rate and selected from the pixels within the peripheral area having the large size at random. With the pixel thinning-out section 25, the peripheral pixels having the predetermined rate of the peripheral pixels whose pixel values are supplied from the peripheral pixel acquiring section 24 are sampled at random, and the pixel values thereof are supplied to the noise removing portion 26.

Therefore, when the shutter speed of the digital camera is set to the high speed, with the ε filter as the noise removing portion 26, the filtering is carried out by using the peripheral pixels (peripheral objective pixels) having the predetermined rate which are selected (sampled) from the peripheral pixels within the peripheral area having the large size at random.

Here, in the sampling pattern representing the positions of the pixels having the predetermined rate which are selected (sampled) from the peripheral pixels within the peripheral area having the large size at random, for example, (the number close to) the number of pixels within the peripheral area having the default size, or the like can be adopted as the number of pixels having the predetermined rate.

In this case, with an amount of arithmetic operation similar to the case where the peripheral area having the default size is set as the peripheral area, that is, the noise can be effectively removed from the image signal of the objective image in which the S/N ratio is remarkably deteriorated while an increase in amount of arithmetic operation is suppressed.

It is noted that an operation mode when the shutter speed of the digital camera is set to the speed not being the high speed is referred as a default mode, and an operation mode when the shutter speed of the digital camera is set to the high speed is referred as a high-speed mode as well.

Since the operation in the default mode is the same as that of the existing digital camera, in the following description, a description of the defect mode is omitted and a description of the high-speed mode is given unless otherwise stated.

[Description of Processing in Peripheral Objective Pixel Random Acquiring Portion 23]

Figure 3:
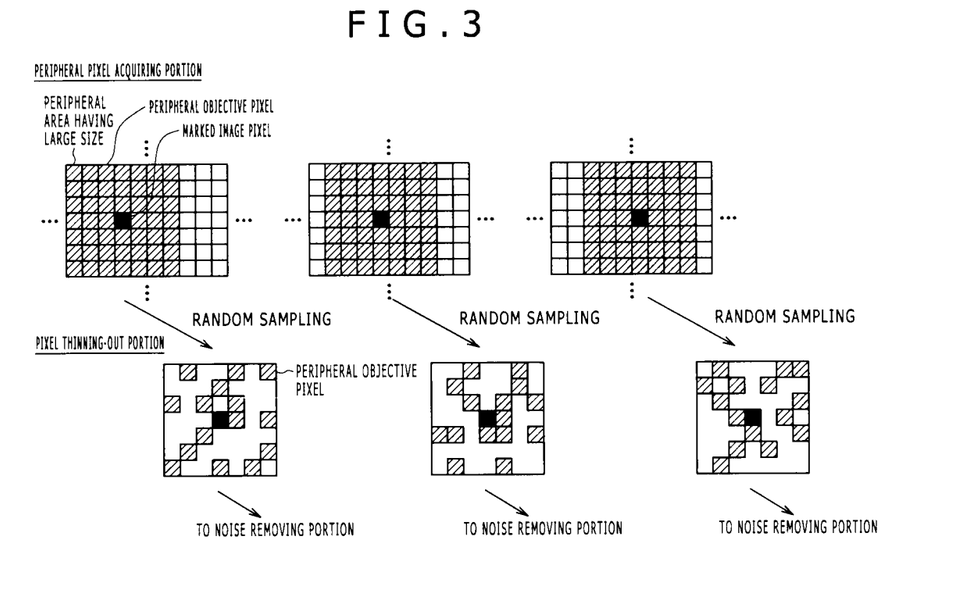
FIG. 3 is a diagram explaining processing in a peripheral pixel acquiring section and a pixel thinning-out section including in the noise removing device shown in FIG. 2.

FIG. 3 is a diagram explaining processing in the peripheral pixel acquiring section 24 and the pixel thinning-out section 25 (in a phase of the high-speed mode) composing the peripheral objective pixel random acquiring portion 23 shown in FIG. 2.

As described above, the peripheral pixel acquiring section 24 sets the peripheral area having the large size in accordance with the control made by the control portion 27. Also, the peripheral pixel acquiring section 24 acquires the pixel values of the peripheral pixels as the pixels (other than the marked pixel) within the peripheral area by reading out the pixel values of the peripheral pixels as the pixels within the peripheral area from the buffer 21, and supplies the pixel values of the peripheral pixels thus read out to the pixel thinning-out section 25.

Referring to FIG. 3, a certain pixel is selected as the marked pixel, and an area having the pixels of 7×7 with the marked pixel as a center is set as the peripheral area having the large size. Also, the pixel values of the peripheral pixels as the pixels within the peripheral area having the large size are acquired, and are then supplied to the pixel thinning-out section 25.

In addition, after that, the pixel on an immediate right-hand side of the marked pixel is selected as a new marked pixel, and this is repetitively followed by the same processing.

The pixel thinning-out section 25 samples the peripheral pixels whose pixel values are supplied thereto from the peripheral pixel acquiring section 24 in accordance with the sampling pattern from the control portion 27. Also, the pixel thinning-out section 25 supplies the pixel values of the peripheral pixels obtained through the sampling as the pixel values of the peripheral objective pixels to the noise removing portion 26.

Here, as described above, with the control portion 27, the pixels having the predetermined rate within the peripheral area having the large size are selected at random, and the sampling pattern representing the positions of the pixels obtained through the random selection is set. Therefore, as a result, with the pixel thinning-out section 25, of the peripheral pixels whose pixel values are supplied from the peripheral pixel acquiring section 24, the peripheral pixels having the predetermined rate are sampled at random and the pixel values thereof are supplied as the pixel values of the peripheral objective pixels to the noise removing portion 26.

Also, with the noise removing portion 26, the filtering is carried out not by using all of the pixel values of the peripheral pixels within the peripheral area having the large size, but by using the pixel values of the peripheral objective pixels as the peripheral pixels having the predetermined rate and selected from the peripheral pixels at random. Therefore, the noise can be effectively removed away while an increase in amount of arithmetic operation is suppressed.

As described above, with the noise removing device, a part of the peripheral pixels within the peripheral area having the large size is thinned out. Also, the filtering is carried out by using the pixel values of the peripheral objective pixels as the peripheral pixels after the thinning-out.

As a result, the artifact is generated in the image (post-noise removal image) obtained through the filtering in the noise removal portion 26 due to the thinning-out of the peripheral pixels, thereby reducing the image quality.

The reduction of the image quality of the post-noise removal image due to the artifact as described above is especially remarkable in a portion of a periodic pattern.

Then, the control portion 27 (refer to FIG. 2) suitably changes the sampling pattern representing the positions of the pixels which are to be sampled at random.

That is to say, for example, in FIG. 3, the sampling pattern is changed every marked pixel, in a word, every one pixel corresponding to the objective image.

As a result, with the pixel thinning-out section 25, of the peripheral pixels whose pixel values are supplied from the peripheral pixel acquiring section 24, the peripheral pixels having the predetermined rate are sampled at random in accordance with the pattern which differs every pixel corresponding to the objective image, and the pixel values thereof are supplied as the pixel values of the peripheral objective pixels to the noise removing portion 26.

As described above, when the sampling of the peripheral pixels is carried out at random, and the pattern (sampling pattern) representing the positions of the peripheral pixels which are to be sampled at random is changed every one pixel corresponding to the objective image, the artifact is generated at random in the image (post-noise removal image) obtained through the filtering in the noise removing portion 26 (the component of the artifact becomes random). Therefore, the artifact becomes inconspicuous.

Therefore, in the noise removal for the image, the reduction of the image quality due to the generation of the artifact generated owing to the thinning-out can be readily prevented.

That is to say, even when although a suitable LPF is designed so as to suppress the artifact, and the filtering by such an LPF is not carried out, it is possible to prevent the reduction of the image quality due to the generation of the artifact.

It is noted that the change of the sampling pattern can be carried out every plural pixels instead of being carried out every one pixel.

In addition, in FIGS. 2 and 3, for ease of understanding, in the peripheral objective pixel random acquiring pattern 23, the peripheral pixel acquiring section 24 reads out the pixel values of the peripheral pixels within the peripheral area having the large size from the buffer 21. After that, the pixel thinning-out section 25 samples the peripheral pixels within the peripheral area having the large size at random, thereby acquiring the peripheral objective pixels used for the filtering for the noise removal. However, with the peripheral objective pixel random acquiring pattern 23, only the pixel values of the peripheral objective pixels can be acquired by directly reading out only the pixel values of the peripheral objective pixels from the buffer 21.

In addition, in the case described above, the positions of the pixels contained in the sampling pattern (the positions of the pixels which can become the positions represented by the sampling pattern) are not especially limited, in a word, the peripheral pixels which can become the peripheral objective pixels are not especially limited. However, a given limitation (hereinafter referred to as "a pattern limitation" as well) can be imposed on the positions of the pixels contained in the sampling pattern.

With regard to the pattern limitation, for example, it is possible to adopt that the position(s) of the defect pixel(s) of the imaging element 11 (refer to FIG. 1) is(are) contained in the sampling pattern about the marked pixel.

When it is adopted as the pattern limitation that the position(s) of the defect position(s) is(are) not limited in the sampling pattern about the marked pixel, the control portion 27 acquires information on the defect pixel(s) of the imaging element 11, and sets the sampling pattern not containing therein the position(s) of (the peripheral pixel(s) becoming) the defect pixel(s) of the peripheral pixels within the peripheral area with respect to the marked pixel.

In the case, it is possible to prevent the performance of the noise removal from being deteriorated due to the fact that the defect pixel becomes the peripheral objective pixel, and is used for the filtering for the noise terminal.

In addition, for example, it is possible to adopt as the pattern limitation that a part of the peripheral objective pixels acquired about the last marked pixel is contained in the sampling pattern about the marked pixel.

When it is adopted as the pattern limitation that a part of the peripheral objective pixels acquired about the last marked pixel is contained in the sampling pattern about the marked pixel, the control portion 27 sets the sampling pattern containing therein the positions of a part of the peripheral objective pixels acquired about the last marked pixel with respect to the current marked pixel.

In this case, a part of the peripheral objective pixels used for the filtering for the noise removal with respect to the current marked pixel (hereinafter referred to as "the current peripheral objective pixel" as well) is also the peripheral objective pixels used for the filtering for the noise removal with respect to the last marked pixel (hereinafter referred to as "the last peripheral objective pixel" as well). Also, when the processing for the last marked pixel is executed, the pixel values of the current peripheral objective pixels represented as the last peripheral objective pixels as well are read out from the buffer 21. When the processing for the current marked pixel is executed, the pixel values which are read out from the buffer 21 in a phase of the processing for the last marked pixel can be latched to be utilized, and thus need not to be read out from the buffer 21.

As a result, it is possible to reduce the number of accesses to the buffer 21.

In addition thereto, for example, it is possible to adopt as the pattern limitation that the pixel whose position is represented by the sampling pattern about one pixel of the two pixels adjacent to each other, and the pixel whose position is represented by the sampling pattern about the other pixel do not overlap each other.

When it is adopted as the pattern limitation that the pixel whose position is represented by the sampling pattern about one pixel of the two pixels adjacent to each other, and the pixel whose position is represented by the sampling pattern about the other pixel do not overlap each other, the control portion 27 sets the sampling patterns about the two pixels adjacent to each other in such a way that the pixel whose position is represented by the sampling pattern about one pixel of the two pixels adjacent to each other, and the pixel whose position is represented by the sampling pattern about the other pixel do not overlap each other, that is, for example, in such a way that the pixel whose position is represented by the sampling pattern about one pixel of the two pixels adjacent to each other, and the pixel whose position is represented by the sampling pattern about the other pixel become a so-called nested state.

In this case, since with regard to the two pixels adjacent to each other, the pixels becoming the peripheral objective pixels do not overlap each other, the pixel values of the peripheral objective pixels about one pixel, and the pixel values of the peripheral objective pixels about the other pixel can be simultaneously read out from the buffer 21. Thus, when the two (or more) pieces of processing for the two (or more) pixel values of the two (or more) pixels are executed in parallel with each other, the parallel processing can be executed at the high speed.

Here, when it is adopted as the pattern limitation that the position(s) of the defect position(s) is(are) not contained in the sampling pattern about the marked pixel, the control portion 27, for example, selects the peripheral pixels within the peripheral area at random, excludes (any of) the defect pixel(s) from the peripheral pixels after the random selection, and sets the sampling pattern representing the positions of the remaining peripheral pixels. Or, the control portion 27, for example, excludes any of the defect pixels from the peripheral pixels within the peripheral area, selects the remaining peripheral pixels at random, and sets the sampling pattern representing the positions of the peripheral pixels after the random selection.

In addition, when it is adopted as the pattern limitation that the position(s) of a part of the peripheral objective pixels acquired about the last marked pixel is(are) contained in the sampling pattern about the marked pixel, the control portion 27, for example, allocates a high probability to the peripheral pixels set as the peripheral objective pixels about the last marked pixel of the peripheral pixels within the peripheral area about the current marked pixel, and allocates a low probability to other peripheral pixels. Also, the control portion 27 selects the peripheral pixels within the peripheral area about the current marked pixel at random in accordance with the probabilities thus allocated, and sets the sampling pattern representing the positions of the peripheral pixels after the random selection.

Moreover, when it is adopted as the pattern limitation that the pixel whose position is represented by the sampling pattern about one pixel of the two pixels adjacent to each other, and the pixel whose position is represented by the sampling pattern about the other pixel do not overlap each other, the control portion 27, for example, selects the peripheral pixels within the peripheral area at random with respect to one pixel of the two pixels adjacent to each other, and sets the sampling pattern representing the positions of the peripheral pixels after the random selection. Also, the control portion 27 excludes the peripheral pixels selected (as the peripheral objective pixels) with respect to one pixel from the peripheral pixels within the peripheral area, selects the remaining peripheral pixels at random, and sets the sampling pattern representing the positions of the peripheral pixels after the random selection.

It is noted that although in the foregoing, the still image is adopted as the objective image, and the sampling pattern, for example, is changed every one pixel corresponding to the objective image as the still image in the control portion 27, the moving image can also be adopted as the objective image.

When the moving image is adopted as the objective image, with the control portion 27, the sampling pattern can be changed every pixels, of the objective image as the moving image, arranged in a space direction, and every pixels arranged in a time direction.

In this case, the artifact becomes inconspicuous both in the space direction and in the time direction of the moving image, and thus with regard to the moving image, the reduction of the image quality due to the generation of the artifact can be readily prevented.

[Noise Removing Processing]

Figure 4:
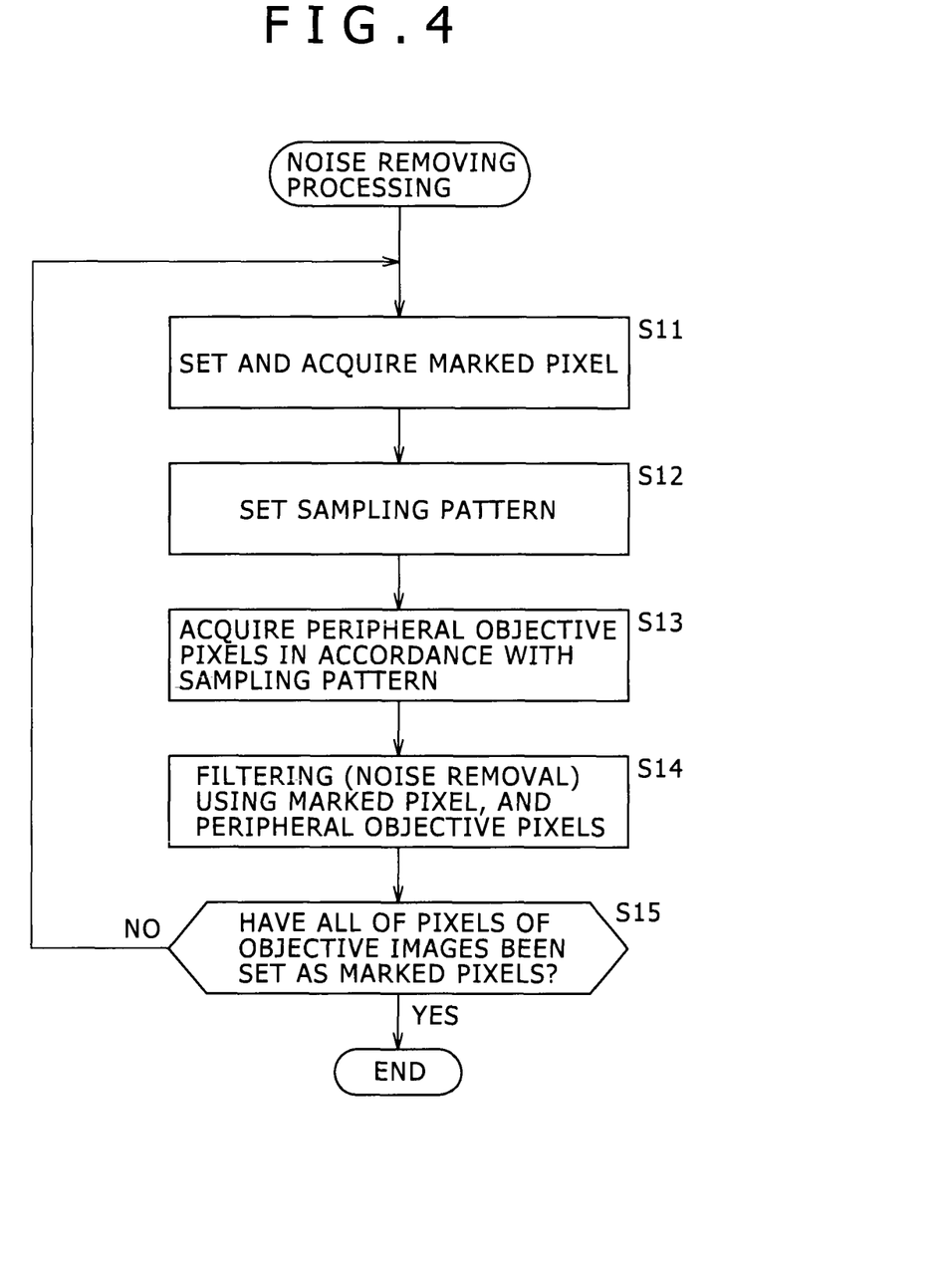
FIG. 4 is a flow chart explaining noise removing processing.

FIG. 4 is a flow chart explaining noise removing processing executed by the noise removing device shown in FIG. 2.

The image data is supplied from the preprocessing portion 12 to the noise removing device, and is then stored as (the image data on) the objective image as the object of the noise removal in the buffer 21.

When the image data on the objective image has been stored in the buffer 21, the noise removing processing is started.

That is to say, in Step S11, the marked pixel acquiring portion 22 selects the first pixel, for example, in the raster scanning order of the pixels each of which is not yet set as the marked pixel among of the pixels corresponding to the objective image whose pixel values are stored in the buffer 21 as the marked pixel, and acquires the marked pixel by reading out the pixel value of the marked pixel from the buffer 21.

Also, the marked pixel acquiring portion 22 supplies the pixel value of the marked pixel acquired from the buffer 21 to the noise removing portion 26, and the operation then proceeds from the processing in Step S11 to processing in Step S12.

In Step S12, the control portion 27 sets the sampling pattern with respect to the marked pixel, and supplies the data on the sampling pattern thus set to the peripheral objective pixel random acquiring portion 23. Then, the operation proceeds to processing in Step S13.

In Step S13, the peripheral objective pixel random acquiring portion 23 acquires the pixel values of the peripheral pixels stored in the buffer 21 in accordance with the sampling pattern the data on which is supplied from the control portion 27 by reading out the pixel values of the peripheral pixels stored in the buffer 21 as the peripheral objective pixels used for the filtering for the noise removal.

Also, the marked pixel acquiring portion 22 supplies the pixel values of the peripheral objective pixels acquired from the buffer 21 to the noise removing portion 26. Then, the operation proceeds from the processing in Step S13 to processing in Step S14.

In Step S14, the noise removing portion 26 carries out the filtering by the $\epsilon$ filter with respect to the marked pixel by using both of the pixel value of the marked pixel supplied thereto from the marked pixel acquiring portion 22, and the pixel values of the peripheral objective pixels supplied thereto from the peripheral objective pixel random acquiring portion 23. Also, the noise removing portion 26 outputs the resulting pixel value obtained through the filtering as the pixel value of the marked pixel of the post-noise removal image obtained by removing the noise from the image signal of the objective image.

After that, the operation proceeds from the processing in Step S14 to processing in Step S15. In Step S15, the marked pixel acquiring portion 22 determines whether or not all of the pixels corresponding to the objective image whose pixel values are stored in the buffer 21 has been each set as the marked pixel.

When it is determined in Step S15 that the pixel(s) which is(are) not yet set as the marked pixel exists(exist) in the pixels corresponding to the objective image whose pixel values are stored in the buffer 21, the operation returns back to the processing S11. In Step S11, the marked pixel acquiring portion 22 selects the pixel next to the marked pixel in the raster scanning order of the pixels corresponding to the objective image whose pixel values are stored in the buffer 21 as the new marked pixel. This is repetitively followed by the same processing.

On the other hand, when it is determined in Step S15 that all of the pixels corresponding to the objective image whose pixel values are stored in the buffer 21 has been each set as the marked pixel, the noise removing processing is completed.

3. Second Embodiment

[Second Configuration of Noise Removing Device]

Figure 5:
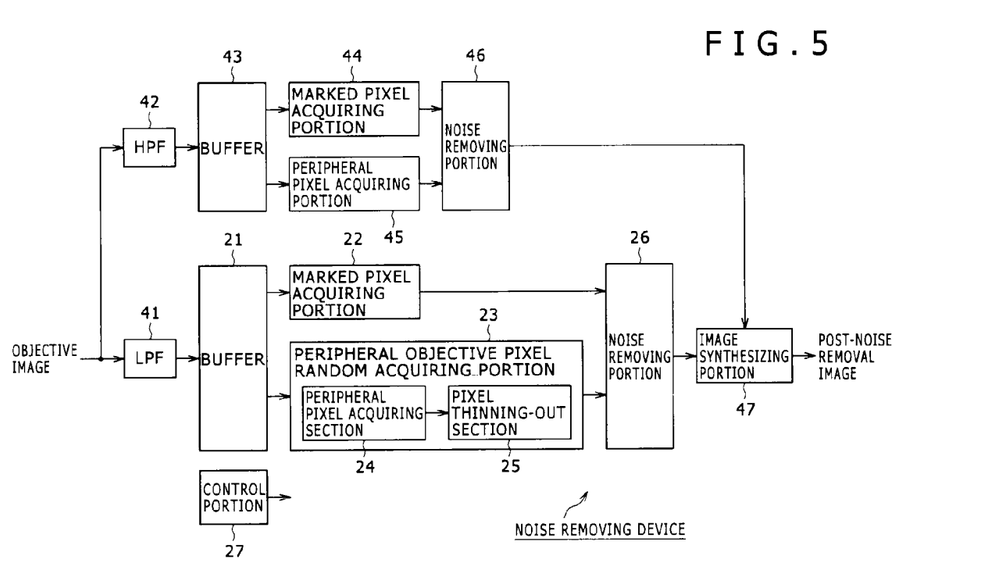
FIG. 5 is a block diagram showing a second configuration of a noise removing device as an image processing device according to a second embodiment of the present disclosure.

FIG. 5 is a block diagram showing a second configuration of a noise removing device, as a portion (image processing device) for executing noise removing processing according to a second embodiment of the present disclosure in the optical correcting portion 13 shown in FIG. 1.

It is noted that in FIG. 5, portions corresponding to those of the noise removing device shown in FIG. 2 are designated by the same reference numerals, respectively, and a description thereof is suitably omitted for the sake of simplicity.

With the noise removing device shown in FIG. 5, an image signal of an objective image is divided into a low-frequency component and a high-frequency component in terms of the band. Also, a noise of an image signal of an image having the low-frequency component, and a noise of an image signal of an image having the high-frequency component are removed separately from each other.

That is to say, with the noise removing device shown in FIG. 5, the image signal of the objective image is supplied to each of an LPF 41 and an HPF 42.

The LPF 41 extracts a low-frequency component of an image signal of the objective image by filtering the image signal of the objective image thus supplied thereto, and supplies the image signal of the image of the low-frequency component (hereinafter referred to as "the low-frequency component image" as well) to the buffer 21.

Also, with the buffer 21 to the control portion 27, the same processing as that in the case of FIG. 2 is executed with the low-frequency component image as an object. Also, the image signal of the resulting image obtained by removing the noise from the image signal of the low-frequency component image (hereinafter referred to as "the post-noise removal low-frequency image" as well) is supplied from the noise removing portion 26 to an image synthesizing portion 47.

On the other hand, the HPF 42 extracts a high-frequency component of the image signal of the objective image by filtering the image signal of the objective image thus supplied thereto, and supplies the image signal of the image of the high-frequency component (hereinafter referred to as "the high-frequency component image" as well) to the buffer 43.

Here, both of the LPF 41 and the HPF 42 are designed in such a way that the objective image is restored, for example, when the low-frequency component image and the high-frequency component image are synthesized with each other.

The buffer 43 temporarily stores therein the image signal of the high-frequency component image supplied thereto from the HPF 42.

The marked pixel acquiring portion 44 selects each of the pixels corresponding to the high-frequency component image whose image signal is stored in the buffer 43, for example, in the raster scanning order similarly to the case of the marked pixel acquiring portion 22, acquires the pixel value of the marked pixel by reading out the pixel value of the marked pixel thus acquired to the noise removing portion 46.

The peripheral pixel acquiring portion 45 acquires all of the peripheral pixels within the peripheral area, for example, similar to the case of the peripheral objective pixel random acquiring portion 23 with respect to the marked pixel of the pixels corresponding to the high-frequency component image whose image signals are stored in the buffer 43 as the peripheral objective pixels used for the filtering for the noise removal. Also, the peripheral pixel acquiring portion 45 supplies the pixel values of the peripheral objective images thus acquired to the noise removing portion 46.

The noise removing portion 26, for example, is composed of a two-dimensional median filter having a less amount of arithmetic operation. Also, the noise removing portion 26 carried out the filtering for the noise removal with respect to the marked pixel by using both of the pixel values of the marked pixel supplied thereto from the marked pixel acquiring portion 44, and the pixel values of the peripheral objective pixels supplied thereto from the peripheral pixel acquiring portion 45. Also, the noise removing portion 26 supplies the resulting pixel value obtained through the filtering as the pixel value of the marked pixel corresponding to the image whose image signal is obtained by removing the noise from the image signal of the high-frequency image (hereinafter referred to as "the post-noise removal high-frequency image" as well) to the image synthesizing portion 47.

The image synthesizing portion 47 synthesizes the post-noise removal low-frequency image from the noise removing portion 26, and the post-noise removal high-frequency image from the noise removing portion 46 with each other, and outputs the image signal of the resulting image after the synthesis as the image signal of the post-noise removal image obtained by removing the noise from the image signal of the objective image.

According to the noise removing device shown in FIG. 5, the image signal of the objective image is divided into the low-frequency component and the high-frequency component in terms of the band by both of the LPF 41 and the HPF 42, and the filtering for the noise removal is carried out by using the peripheral objective pixels sampled from the peripheral pixels within the peripheral area with respect to the image of the low-frequency component (low-frequency component image). Therefore, it is possible to suppress the artifact due to the sampling (thinning-out). In addition, since the sampling of the peripheral objective pixel from the peripheral pixels is carried out at random with respect to the low-frequency component image, even when the artifact is generated due to the sampling, it is possible to prevent the artifact from being conspicuous.

Therefore, the sampling of the peripheral objective pixel from the peripheral pixels is carried out at random with respect to the low-frequency component image, whereby it is possible to prevent the artifact from being conspicuous. As a result, with regard to the design of the LPF 41, it is unnecessary to be severely conscious of suppression of the artifact so much.

4. Third Embodiment

[Program]

A program according to a third embodiment of the present disclosure causes a computer to make a function so as to include: the peripheral objective image random acquiring section 23 for acquiring the pixels obtained by sampling the peripheral pixels located in the periphery of the marked pixel which is marked at random with respect to the marked pixel of the pixels corresponding to the objective image as the object of the noise removal as the peripheral objective pixels as the pixels used for filtering for noise removal; and the noise removing section 26 for carrying out the filtering for the noise removal by using the peripheral objective pixels.

In the program of the third embodiment, the noise removing device of the first embodiment is applied. However, it goes without saying that the noise removing device of the second embodiment can also applied to the program of the present disclosure.

5. Use Application

[Description of Computer]

Next, the series of processing described above either can be executed by hardware or can be executed by software. When the series of processing described above are executed by the software, the program composing the software is installed in a general-purpose computer or the like.

Figure 6:
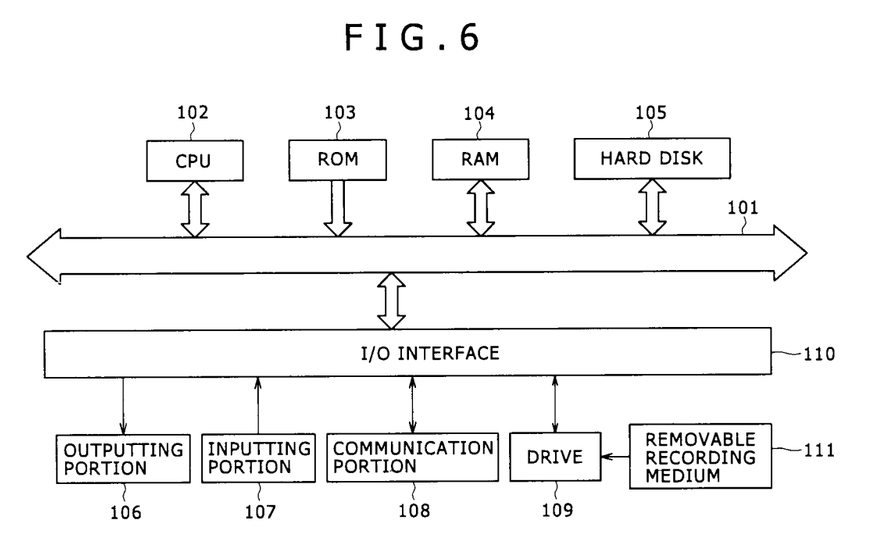
FIG. 6 is a block diagram showing an example of a configuration of a computer in which a program is installed.

Then, FIG. 6 shows an example of a configuration of the computer in which the program for executing the series of processing is installed.

The program can be previously recorded either in a hard disk 105 or in a ROM 103 as a recording media built in the computer.

Or, the program can be stored (recorded) in a removable recording media 111. Such a removable recording media 111 can be provided as so-called package software. Here, a flexible disk, a Compact Disc Read Only Memory (CD-ROM), a Magneto Optical (MO) disk, a Digital versatile Disc (DVD), a magnetic disk, a semiconductor memory, or the like is given as the removable recording media 111.

It is noted that in addition to the installing of the program from the removable recording media 111 as described above in the computer, the program can be downloaded to the computer through either a communication network or a broadcasting network to be installed in the hard disk 105 built in the computer. That is to say, the program, for example, either can be transferred from a download site to the computer in a wireless manner through an artificial satellite for a digital satellite broadcasting or can be transferred to the computer in a wired manner through a network such as a Local Area Network (LAN) or the Internet.

The computer has a Central Processing Unit (CPU) 102 built therein, and an I/O interface 110 is connected to the CPU 102 through a bus 101.

When an instruction is inputted to the CPU 102 through the I/O interface 110 by manipulating the inputting portion 109 by a user, the CPU 102 executes the program stored in a Read Only Memory (ROM) 103 in accordance with the instruction thus inputted. Or, the CPU 102 loads the program stored in the hard disk 105 into a Random Access Memory (RAM) 104, thereby executing the program.

As a result, the CPU 102 executes either the processing complying with the flow chart described above, or the processing based on the configuration of the block diagram described above. Also, the CPU 102, for example, outputs the processing result from an outputting portion 106 through the I/O interface 110, transmits the processing result from the communication portion 108, or records the processing result in the hard disk 105 as may be necessary.

It is noted that the inputting portion 107 is composed of a keyboard, a mouse, a microphone or the like. In addition, the outputting portion 106 is composed of a Liquid Crystal Display (LCD) device, a speaker or the like.

Here, in this specification, the processing which the computer executes in accordance with the program is not necessarily executed in a time series manner along the order described in the form of the flow chart. That is to say, the processing which the computer executes in accordance with the program also includes predetermined pieces of processing as well which are executed in parallel or independently (such as the parallel processing or the processing by an object).

In addition, the program may be processed by one computer (processor) or may be distributively processed by plural computers. Moreover, the program may be transferred to a remote computer to be executed.

It should be noted that the embodiments of the present disclosure are by no means limited to the embodiments described above, and various kinds of changes can be made without departing from the subject matter of the present disclosure.

That is to say, in the embodiments of the present disclosure, when the shutter speed of the digital camera, for example, is set to the high speed, and thus the S/N ratio of the objective image is remarkably deteriorated, the filtering for the noise removal is carried out by using the peripheral pixels (peripheral objective pixels) having the predetermined rate selected from the peripheral pixels within the peripheral area having the large size at random. However, the filtering using the peripheral pixels having the predetermined rate and selected from the peripheral pixels within the peripheral area having the large size at random can be carried out for the image in which the S/N ratio is not deteriorated so much.

In addition, the image data for the noise removing processing is by no means limited to the RAW data. That is to say, the noise removing processing, for example, can be executed for the image data, such as a luminance signal Y, and color difference signals Cb and Cr, other than the RAW data.

In addition, in the embodiments described above, with the optical correcting portion 13, the noise removing processing is executed for the image data supplied from the preprocessing portion 12. In addition thereto, however, the noise removing processing, for example, can be executed at a timing right before or right after the de-mosaic processing, or right after the gamma correcting processing in the signal processing portion 14.

In addition, the present disclosure can be applied to an apparatus or device for processing an image such as a television receiver (TV) in addition to the digital camera.

The present disclosure contains subject matter related to that disclosed in Japanese Priority Patent Application JP 2010-275819 filed in the Japan Patent Office on Dec. 10, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a peripheral objective pixel random acquiring section acquiring pixels obtained by sampling peripheral pixels located in a periphery of a marked pixel, which is marked at random with respect to the marked pixel of pixels, corresponding to an objective image as an object of noise removal as peripheral objective pixels used for filtering for noise removal;
a noise removing section carrying out filtering for the noise removal by using the peripheral objective pixels; and
a setting section setting a sampling pattern representing positions of the pixels which are to be sampled at random in such a way that a pixel whose position is represented by the sampling pattern about one pixel of two pixels adjacent to each other, and a pixel whose position is represented by the sampling pattern about the other pixel do not overlap each other.

2. An image processing device comprising: a peripheral objective pixel random acquiring section acquiring pixels obtained by sampling peripheral pixels located in a periphery of a marked pixel, which is marked at random with respect to the marked pixel of pixels, corresponding to an objective image as an object of noise removal as peripheral objective pixels used for filtering for noise removal;
a noise removing section carrying out filtering for the noise removal by using the peripheral objective pixels; and
a setting section setting a sampling pattern representing positions of the pixels which are to be sampled at random,
wherein the objective image is a moving image, said setting section changes the sampling pattern for every pixel arranged in a space direction and for every pixel arranged in a time direction, and said peripheral objective pixel random acquiring section acquires the peripheral objective pixels in accordance with the sampling pattern.

3. An image processing method, comprising: acquiring pixels obtained by sampling peripheral pixels located in a periphery of a marked pixel, which is marked at random with respect to the marked pixel of pixels, corresponding to an objective image as an object of noise removal as peripheral objective pixels used for filtering for noise removal by an image processing device;
carrying out filtering for the noise removal by using the peripheral objective pixels by said image processing device; and
setting a sampling pattern representing positions of the pixels which are to be sampled at random in such a way that a pixel whose position is represented by the sampling pattern about one pixel of two pixels adjacent to each other, and a pixel whose position is represented by the sampling pattern about the other pixel do not overlap each other.

4. A non-transitory computer-readable medium including a program causing a computer to make a function so as to comprise:
a peripheral objective pixel random acquiring section acquiring pixels obtained by sampling peripheral pixels located in a periphery of a marked pixel, which is marked at random with respect to the marked pixel of pixels, corresponding to an objective image as an object of noise removal as peripheral objective pixels used for filtering for noise removal;
a noise removing section carrying out filtering for the noise removal by using the peripheral objective pixels; and
setting a sampling pattern representing positions of the pixels which are to be sampled at random in such a way that a pixel whose position is represented by the sampling pattern about one pixel of two pixels adjacent to each other, and a pixel whose position is represented by the sampling pattern about the other pixel do not overlap each other.

* * * * *